(12) United States Patent
Xia et al.

(10) Patent No.: US 12,309,042 B2
(45) Date of Patent: May 20, 2025

(54) NETWORK ACCESS METHOD, APPARATUS, AND SYSTEM

(71) Applicant: Huawei Technologies Co., Ltd., Shenzhen (CN)

(72) Inventors: Xin Xia, Nanjing (CN); Shuo Yuan, Beijing (CN); Rongrong Hua, Nanjing (CN); Shuming Che, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/157,257

(22) Filed: Jan. 20, 2023

(65) Prior Publication Data

US 2023/0164037 A1    May 25, 2023

Related U.S. Application Data

(63) Continuation of application No. PCT/CN2021/107823, filed on Jul. 22, 2021.

(30) Foreign Application Priority Data

Jul. 24, 2020  (CN) .......................... 202010724017.7

(51) Int. Cl.
*H04L 41/5019* (2022.01)
*H04L 41/40* (2022.01)
*H04L 43/0852* (2022.01)

(52) U.S. Cl.
CPC .......... *H04L 41/5019* (2013.01); *H04L 41/40* (2022.05); *H04L 43/0852* (2013.01)

(58) Field of Classification Search
CPC .. H04L 41/5019; H04L 41/40; H04L 41/5067; H04L 41/0806; H04L 41/0823; H04L 41/5009; H04L 43/0852; H04L 43/0829; H04L 43/087
See application file for complete search history.

(56) References Cited

U.S. PATENT DOCUMENTS

| | | |
|---|---|---|
| 2017/0208011 A1 | 7/2017 | Bosch et al. |
| 2018/0063018 A1* | 3/2018 | Bosch .................. H04L 47/822 |
| 2020/0229042 A1 | 7/2020 | Srivastava et al. |

(Continued)

OTHER PUBLICATIONS

Broadband Forum: "TR-459 Control and User Plane Separation for a disaggregated BNG", 3GPP Draft; C4-203064, 3rd Generation Partnership Project (3GPP), Mobile Competence Centre ; 650, Route Deslucioles; F-06921 Sophia-Antipolis Cedex; France No. Default_Value; Issue: 1, Issue Date: Apr. 2020, 2020040114, server date May 14, 2020, XP051882750, total 103 pages.

(Continued)

*Primary Examiner* — Azizul Choudhury
(74) *Attorney, Agent, or Firm* — Slater Matsil, LLP

(57) ABSTRACT

A first device obtains first detection data of network performance between a steering function SF device and a first user plane UP device, where the first UP device is a UP device in a communication system in which a control plane CP is separated from a UP. Then, the first device configures the SF device and the first UP device based on the first detection data, to enable a first user to access a network through the SF device and the first UP device, where the first detection data meets a network performance requirement of the first user.

19 Claims, 10 Drawing Sheets

(56) References Cited

U.S. PATENT DOCUMENTS

2021/0127271 A1* 4/2021 Wu .................. H04W 12/0471

OTHER PUBLICATIONS

Sgambelluri, Andrea et al: "Generalized SDN control for access/metro/core integration in the framework of the interface to the Routing System (12RS)", IE, 2013 IEEE GlobeCom Workshops (GC SHPS), Dec. 9, 2013 (Dec. 9, 2013), pp. 1216-1220, 032599938, total 5 pages.

* cited by examiner

NETWORK ACCESS METHOD, APPARATUS, AND SYSTEM

CROSS-REFERENCE TO RELATED APPLICATIONS

This application is a continuation of International Application No. PCT/CN2021/107823, filed on Jul. 22, 2021, which claims priority to Chinese Patent Application No. 202010724017.7, filed on Jul. 24, 2020. The disclosures of the aforementioned applications are hereby incorporated by reference in their entireties.

TECHNICAL FIELD

This application relates to the field of communication technologies, and in particular, to a network access method, apparatus, and system.

BACKGROUND

In a process in which a user accesses a network of a communication system, a control plane (CP) device, a user plane (UP) device, and the like of the communication system need to provide a network service for the user. The communication system is usually provided with a plurality of UP devices, and a session of the user accesses the network through a UP device allocated to the user.

The UP device allocated by the communication system to the user is usually fixed, but network performance between a steering function SF device and the UP device changes. For example, a network delay between the UP device and the SF device changes with a bandwidth congestion status and the like. In this case, a network status between the UP device and the SF device cannot ensure that quality of the network service provided for the user meets a user requirement.

SUMMARY

Embodiments of this application provide a network access method and apparatus, which are used to ensure quality of a network service provided for a user.

According to a first aspect, an embodiment of this application provides a network access method. The method includes: A first device obtains first detection data of network performance between a steering function SF device and a first user plane UP device, where the first UP device is a UP device in a communication system in which a control plane CP is separated from a UP. Then, the first device configures the SF device and the first UP device based on the first detection data, to enable a first user to access a network through the SF device and the first UP device, where the first detection data meets a network performance requirement of the first user.

A UP device used by a user to access a network is dynamically adjusted according to the method, to ensure that detection data of network performance between an SF device and the UP device meets a network performance requirement of the user. Therefore, this helps ensure that quality of a network service provided for the user meets the network performance requirement of the user, and improves user experience.

Optionally, the first device is an SDN controller. The network access method in this case is specifically described below by using a first possible implementation to a seventh possible implementation of the first aspect.

In the first possible implementation of the first aspect, that the SDN controller configures the first UP device based on the first detection data includes: The SDN controller sends first information to a CP device in the communication system, where the first information is used to indicate to connect a session of the first user to the network through the first UP device. The SDN controller may indicate, by sending the first information to the CP device, the CP device to configure the first UP device, and this helps the first user access the network through the SF device and the first UP device.

In a second possible implementation of the first aspect, after the SDN controller sends the first information to the CP, and before the SDN controller configures the SF device based on the obtained detection data, the SDN controller receives response information sent by the CP device for the first information, where the response information is used to indicate that a session table of the first user has been delivered to the first UP device. In this way, the SDN controller may configure the SF device after completing configuration of the first UP device. This helps increase a rate of successfully accessing the network by the first user.

In a third possible implementation of the first aspect, that the SDN controller configures the SF device based on the first detection data includes: The SDN controller sends configuration information to the SF device, where the configuration information is used to indicate the SF to connect the session of the first user to the first UP device.

In a fourth possible implementation of the first aspect, before the SDN controller configures the SF device and the first UP device based on the first detection data, the SDN controller may obtain third information, where the third information is used to indicate that the first user is a user requesting to go online.

In a fifth possible implementation of the first aspect, after the SDN controller configures the SF device and the first UP device based on the first detection data, the SDN controller may obtain second detection data and third detection data, where the second detection data is detection data of the network performance between the SF device and the first UP device, the third detection data is detection data of network performance between the SF device and a second UP device, and the second UP device is a UP device in the communication system. If the second detection data does not meet the network performance requirement of the first user, but the third detection data meets the network performance requirement of the first user, the SDN controller configures the SF device and the second UP device based on the second detection data and the third detection data, to enable the first user to access the network through the SF device and the second UP device. This helps ensure quality of a network service of the user that has accessed the network.

In a sixth possible implementation of the first aspect, the network performance requirement of the first user is determined by the first device according to a service level agreement SLA of the first user.

In the seventh possible implementation of the first aspect, the network performance includes at least one of a network delay, a network jitter, and a network packet loss rate.

Optionally, the first device is a CP device. The network access method in this case is specifically described below by using an eighth possible implementation to a tenth possible implementation of the first aspect.

In the eighth possible implementation of the first aspect, that the CP device configures the SF device based on the first detection data includes: The CP device sends second information to an SDN controller, where the second information is used to indicate the SDN controller to send configuration information to the SF device, and the configuration information is used to indicate the SF device to connect a session of the first user to the first UP device.

In a ninth possible implementation of the first aspect, the first detection data is sent by the SDN controller. Optionally, the SDN controller may collect detection data of network performance between a UP device and the SF device, and report the collected detection data to the CP device.

In the tenth possible implementation of the first aspect, that the CP device configures the first UP device based on the first detection data includes: The CP device sends a session table of the first user to the first UP device.

Optionally, when the first device is the CP device, the network access method further includes another implementation. For the another implementation, refer to any one of the fifth to the seventh possible implementations of the first aspect for understanding. Details are not described herein again.

Optionally, the first device is a device other than the controller and the CP device. Optionally, the device is referred to as a UP steering function (USF) device as an example, and the USF device is a function node configured to formulate a steering policy. For the network access method in this case, refer to the foregoing implementations for understanding. For example, optionally, for a manner in which the USF device configures the first UP device based on the first detection data, refer to the first possible implementation of the first aspect for understanding. Optionally, for a manner in which the USF device configures the SF device based on the first detection data, refer to the eighth possible implementation of the first aspect for understanding. Optionally, when the first device is the USF device, the network access method further includes another implementation. For the another implementation, refer to any one of the second, the fourth, the fifth, the sixth, the seventh, or the ninth possible implementation of the first aspect for understanding. Details are not described herein again.

According to a second aspect, an embodiment of this application provides a network access method. The method includes: A CP device in a communication system in which a control plane CP is separated from a user plane UP receives first information sent by a first device, where the first information is used to indicate that a first user corresponds to a first UP device in the communication system, and detection data of network performance between a steering function SF device and the first UP device meets a network performance requirement of the first user. The CP device sends a session table of the first user to the first UP device. This helps the first user access a network through the SF device and the first UP device, and helps ensure quality of a network service provided for the first user.

Optionally, the first device is the USF device or the SDN controller that is used as an execution body in the method described in the first aspect.

Optionally, after the CP device sends the session table of the first user to the first UP device, the CP device sends response information for the first information to the first device, where the response information is used to indicate that the session table of the first user has been delivered to the first UP device. In this way, the first device may perform other configuration after completing configuration of the first UP device, for example, configure the SF device. This helps increase a rate of successfully accessing the network by the first user.

Optionally, before the CP device receives the first information sent by the first device, the CP device receives a go-online request packet of the first user, and then sends third information to the first device, where the third information is used to indicate that the first user is a user requesting to go online. This helps ensure that a user accesses, when going online in a session establishment process, a network through a UP device that meets a requirement, and improves network use experience of the user.

According to a third aspect, an embodiment of this application provides a network access method. The method includes: A software designed network SDN controller may receive second information sent by a first device, where the second information is used to indicate that a first user corresponds to a first user plane UP device, the first UP device is a UP device in a communication system in which a control plane CP is separated from a UP, and detection data of network performance between a steering function SF device and the first UP meets a network performance requirement of the first user. Then, the SDN controller sends configuration information to the SF device, where the configuration information is used to indicate the SF to connect a session of the first user to the first UP device. Because the detection data of the network performance between the SF device and the first UP meets the network performance requirement of the first user, the SDN controller sends the configuration information to the SF device. This helps the first user access a network through the SF device and the first UP device, and helps ensure quality of a network service provided for the first user.

Optionally, the first device is the USF device or the CP device that is used as an execution body in the method described in the first aspect.

Optionally, before the SDN controller receives the second information sent by the first device, the SDN controller sends the detection data of the network performance between the SF device and the first UP device to the first device. This helps the first device select, for the first user, a UP device that meets the requirement of the first user.

According to a fourth aspect, an embodiment of this application provides a network access method. The method includes: A software designed network SDN controller sends first detection data of network performance between a steering function SF device and a first user plane UP device to a first device, where the first UP device is a UP device in a communication system in which a control plane CP is separated from a UP, the first detection data is used to indicate the first device to configure the SF device and the first UP device, and the first detection data meets a network performance requirement of the first user. This helps the first device select, for the first user, a UP device that meets the requirement of the first user, helps the first user access a network through the SF device and the first UP device, and ensures quality of a network service provided for the first user.

Optionally, after the SDN controller sends the first detection data of the network performance between the SF device and the first UP device to the first device, the SDN controller receives second information sent by the first device, where the second information is used to indicate that the first user corresponds to the first user plane UP device. Then, the SDN controller sends configuration information to the SF device, where the configuration information is used to indicate the SF to connect a session of the first user to the first UP device. Because the detection data of the network performance between the SF device and the first UP meets the network performance requirement of the first user, the SDN controller sends the configuration information to the SF device.

This helps the first user access the network through the SF device and the first UP device, and helps ensure the quality of the network service provided for the first user.

According to a fifth aspect, an embodiment of this application provides a network apparatus. The apparatus may be a network device, may be an apparatus in the network device, or may be an apparatus that can be used together with the network device. In a design, the apparatus may include modules that are in one-to-one correspondence with the methods/operations/steps/actions described in the first aspect, the second aspect, the third aspect, or the fourth aspect. The modules may be implemented by a hardware circuit, software, or a combination of a hardware circuit and software.

According to a sixth aspect, an embodiment of this application provides a network apparatus. The apparatus includes a processor and a memory. The memory is configured to store instructions. The memory is coupled to the processor. When executing the instructions stored in the memory, the processor may implement the method described in the first aspect, the second aspect, the third aspect, or the fourth aspect. The communication apparatus may further include a communication interface. The communication interface is used by the apparatus to communicate with another device. For example, the communication interface may be a transceiver, a circuit, a bus, a module, a pin, or another type of communication interface. The another device may be a terminal device.

According to a seventh aspect, an embodiment of this application provides a chip system. The chip system includes a processor, and may further include a memory. The chip system is configured to implement the method described in the first aspect, the second aspect, the third aspect, or the fourth aspect. The chip system may include a chip, or may include a chip and another discrete component.

According to an eighth aspect, an embodiment of this application provides a computer-readable storage medium. The computer-readable storage medium includes instructions. When the instructions are run on a computer, the computer is enabled to perform the method according to any possible implementation of the first aspect, the second aspect, the third aspect, or the fourth aspect in embodiments of this application.

According to a ninth aspect, an embodiment of this application provides a computer program product. The computer program product includes instructions. When the instructions are run on a computer, the computer is enabled to perform the method according to any possible implementation of the first aspect, the second aspect, the third aspect, or the fourth aspect in embodiments of this application.

According to a tenth aspect, an embodiment of this application provides a communication system. The communication system includes the first device in the method described in the first aspect, the CP device in any one of the second aspect or the possible implementations of the second aspect, and the SDN controller in any one of the third aspect or the possible implementations of the third aspect or any one of the fourth aspect or the possible implementations of the fourth aspect. Alternatively, the communication system includes the SDN controller used as the first device in the possible implementations of the first aspect and the CP device in any one of the second aspect or the possible implementations of the second aspect. Alternatively, the communication system includes the CP device used as the first device in the possible implementations of the first aspect, and the SDN controller in any one of the third aspect or the possible implementations of the third aspect or any one of the fourth aspect or the possible implementations of the fourth aspect. Alternatively, the communication system includes the USF device used as the first device in the possible implementations of the first aspect, the CP device in any one of the second aspect or the possible implementations of the second aspect, and the SDN controller in any one of the third aspect or the possible implementations of the third aspect or any one of the fourth aspect or the possible implementations of the fourth aspect. Alternatively, the communication system includes a steering function SF device, a user plane UP device, and the first device described in the first aspect.

DETAILED DESCRIPTION OF ILLUSTRATIVE EMBODIMENTS

Embodiments of this application provide a network access method and apparatus. Embodiments of this application are described below with reference to accompanying drawings.

A broadband remote access server (BRAS) is a new access gateway oriented to a broadband network application, and is also referred to as a broadband network gateway (broadband network gateway, BNG) or a virtual BNG (VBNG). Usually, the BRAS is deployed in a manner in which a CP device is separated from a UP device (CU separation for short). In the BRAS deployed in the CU separation manner, a plurality of UP devices are deployed in a distributed manner. Each UP device serves as a user plane of the BRAS, and is configured to forward a user packet based on a user entry delivered by the CP device and implement a traffic policy based on technologies such as quality of service (QOS) and an access control list (ACL). The CP device may be implemented by using a cloudification technology and deployed in a centralized manner. As a control plane of the BRAS, the CP device is configured to control and manage a user and manage the plurality of UP devices in a unified manner. For example, the CP device is mainly responsible for managing a go-online process of the user, configuration and user entry delivery, and the like. The UP device may also be referred to as a forwarding plane device. Therefore, the CU separation may also be referred to as forwarding and control separation, namely, forwarding-control separation. A system deployed in the CU separation manner is also referred to as a CU separation communication system or a forwarding-control separation communication system.

Figure 1:
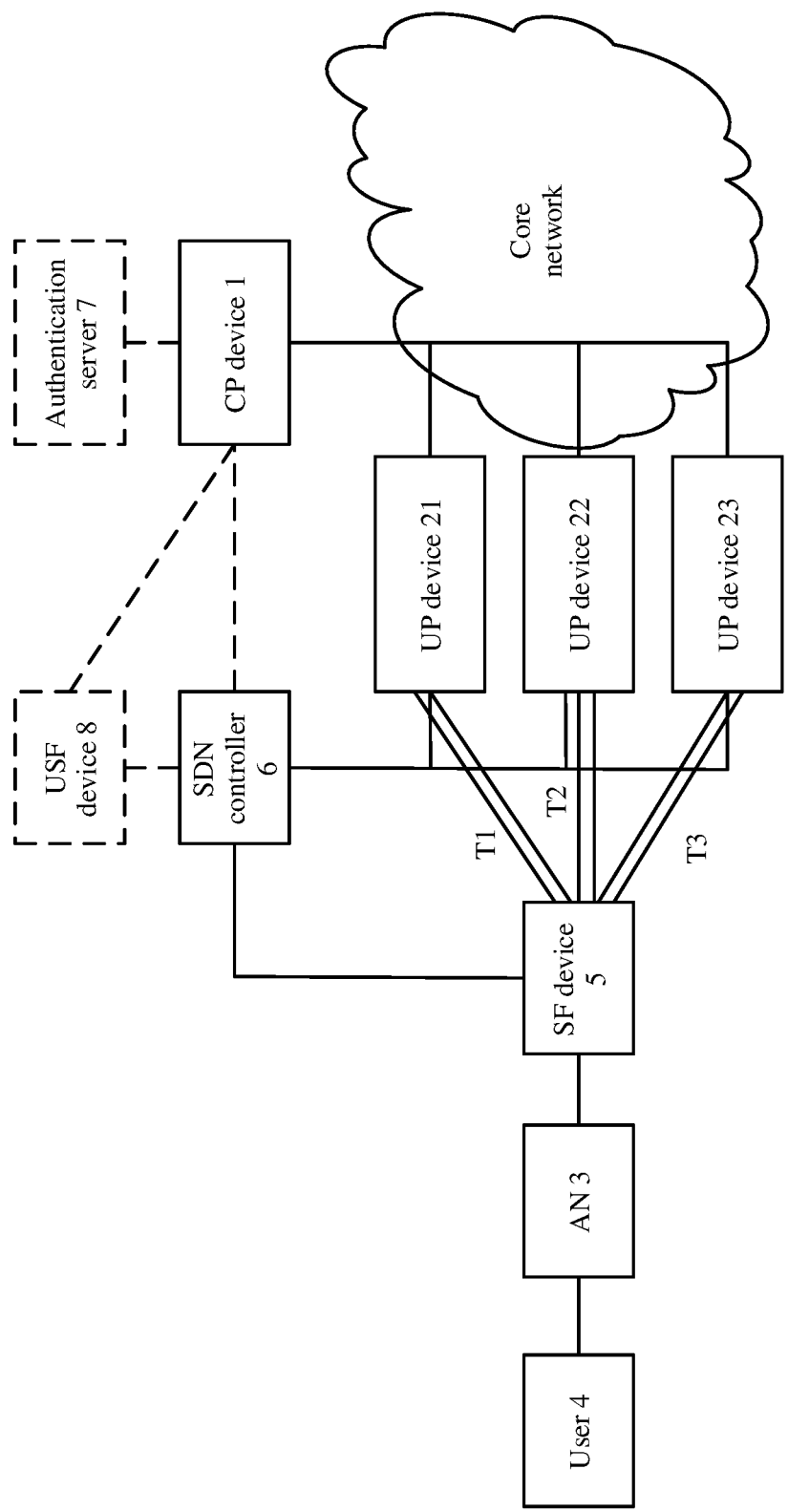
FIG. 1 is a schematic diagram of a structure of a CU separation communication system according to an embodiment of this application.

FIG. 1 is a schematic diagram of a structure of a CU separation communication system according to an embodiment of this application. As shown in FIG. 1, an example in which the CU separation communication system includes one CP device 1 and three UP devices (a UP device 21, a UP device 22, and a UP device 23) is used for illustration. The UP device 21, the UP device 22, and the UP device 23 each may establish a communication connection to at least one user through an access node (AN) 3, and exchange data with the at least one user. In FIG. 1, a user 4 is used as an example for illustration. The user 4 may access a network through the UP device 21, the UP device 22, or the UP device 23.

The CP device 1 is responsible for control and management of the user 4. The CP device 1 may be connected to each UP device in FIG. 1 through a service interface, a management interface, and a control interface. The service interface is usually a virtual extensible local area network (VXLAN) interface. After receiving packets (for example, an access protocol packet and a service packet) sent by the user 4, any UP device in FIG. 1 may send, through the service interface, the packets to the CP device 1 for processing. The management interface is usually a network configuration protocol (NETCONF) interface. The CP device 1 may deliver a configuration to each UP device in FIG. 1 through the management interface, and each UP device in FIG. 1 may report a running status to the CP device 1 through the management interface. The control interface is usually a forwarding-control separation protocol (control plane and user plane separation protocol, CUSP) interface. After completing processing of the access protocol packet sent by the user 4 and completing management of a go-online process of the user 4, the CP device 1 may deliver a user session table (or referred to as a user entry) to a corresponding UP device through the control interface. The user entry usually includes information such as a routing table and quality of service (QOS) of the user 4.

Still refer to FIG. 1. In this embodiment of this application, the CU separation communication system further includes a software-defined networking (SDN) controller 6 and a steering function (SF) device 5. In some application scenarios, the SDN controller 6 in this embodiment of this application may also be replaced with a network control engine (NCE). The SF device 5 is disposed between the AN 3 and the UP devices in FIG. 1. The SDN controller 6 is connected to the SF device 5, and the SDN controller 6 creates layer 2 tunnels between the SF device 5 and the UP devices in FIG. 1. Specifically, the SDN controller 6 separately creates a layer 2 tunnel T1 between the SF device 5 and the UP device 21, a layer 2 tunnel T2 between the SF device 5 and the UP device 22, and a layer 2 tunnel T3 between the SF device 5 and the UP device 23. The SF device 5 may send a packet (including a packet header of the layer 2 tunnel) from the user 4 to a corresponding UP device (the UP device 21, the UP device 22, or the UP device 23) through one of the layer 2 tunnels (T1, T2, or T3), to further send the packet to the CP device 1 or a core network. The layer 2 tunnel may be a virtual local area network (VLAN), a virtual leased line (VLL), a virtual private local area network service (VPLS), a virtual extensible local area network (virtual extensible LAN, VXLAN), or an SRv6. SRv6 is a network forwarding technology that combines a segment routing (segment routing, SR) technology and an internet protocol version 6 (IPv6) technology. Optionally, the SDN controller 6 is connected to the CP device 1, and is configured to communicate with the CP device 1. It should be noted that the "connection" mentioned in this embodiment of this application is not limited to a direct connection, provided that two connected parties can communicate with each other.

Optionally, with reference to FIG. 1, the communication system further includes an authentication server 7, and the authentication server 7 may be a remote authentication dial—in user service (RADIUS) server. The authentication server 7 stores a service level of the user 4, and supports an authentication, authorization, and accounting (AAA) protocol. The authentication server 7 is connected to the CP device 1. After completing exchange of the access protocol packet with the user 4 through the UP device, the CP device 1 may send an authentication request for the user 4 to the authentication server 7. The authentication server 7 may perform authentication on the user 4, and send SLA information of the user 4 to the CP device 1. The SLA information includes the service level of the user 4.

Optionally, as shown in FIG. 1, the communication system further includes a UP steering function (USF) device 8. The USF device 8 is separately connected to the SDN controller 6 and the CP device 1. The USF device 8 may be a function node configured to formulate a steering policy.

In this embodiment of this application, optionally, the CP device 1 may include a plurality of virtual machines (VMs) deployed on a physical server. The UP device 21, the UP device 22, and the UP device 23 may be physical UP (pUP) devices, or may be virtual UP (vUP) devices. For example, the UP device 21, the UP device 22, and the UP device 23 may be VMs deployed on the physical server. The SF device 5 may be a physical device independent of the AN 3, for example, may be a router or a switch independent of the AN 3. Alternatively, the SF device 5 may be a software component disposed in the AN 3. The user 4 may also be referred to as a client device or user equipment, and may be a mobile phone or a computer device such as a notebook computer or a desktop computer. The AN 3 may be a switch (SW), an optical line terminal (OLT), a digital subscriber line access multiplexer (DSLAM), or the like. The AN 3 may encapsulate an outer virtual local area network (VLAN) into a packet used to indicate a location of the user 4.

Figure 2:
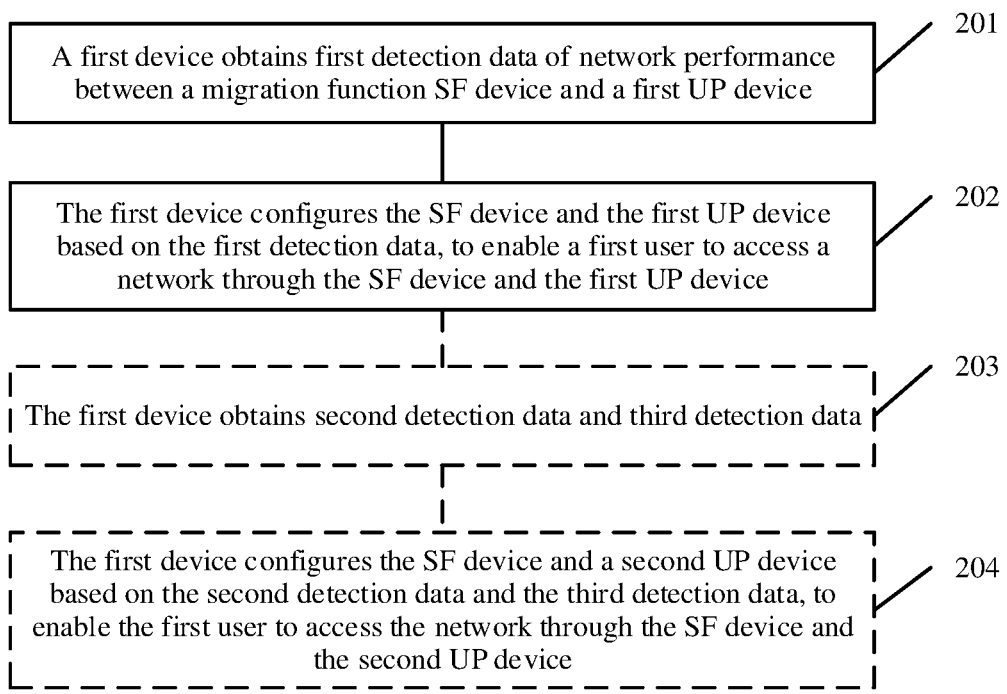
FIG. 2 to FIG. 6 are flowcharts of network access methods according to embodiments of this application.

The foregoing describes an example of a communication system in embodiments of this application with reference to FIG. 1. The following describes network access methods in embodiments of this application. FIG. 2 is a flowchart of a network access method according to an embodiment of this application. The method in the embodiment corresponding to FIG. 2 may be applied to the communication system shown in FIG. 1, or may be applied to another communication system. This is not limited in this embodiment of this application. Optionally, an execution body (namely, a first device) of the network access method shown in FIG. 2 is the SDN controller 6, the CP device 1, or the USF device 8 in FIG. 1. Refer to FIG. 2. The network access method in this embodiment of this application includes step 201 and step 202.

201: The first device obtains first detection data of network performance between a steering function SF device and a first UP device.

The first UP device is a UP device in a CU separation communication system. For example, the first UP device is a UP device in the communication system shown in FIG. 1.

In an optional manner, the UP device in the CU separation communication system may collect detection data of network performance between the UP device and the SF device, and the first device may obtain the detection data collected by the UP device.

Optionally, the detection data is detection data of network performance of a layer 2 tunnel between the UP device and the SF device. For example, the network performance in this embodiment of this application includes at least one of a network delay, a network jitter, and a network packet loss rate.

202: The first device configures the SF device and the first UP device based on the first detection data, to enable a first user to access a network through the SF device and the first UP device.

After the first device obtains the detection data (namely, the first detection data) of the network performance between the SF device and the first UP device, based on a fact that the first detection data meets a network performance requirement of the first user, the first device configures the SF device and the first UP device based on the first detection data, to enable the first user to access the network through the SF device and the first UP device.

Because the first detection data meets the network performance requirement of the first user, the first user accesses the network through the SF device and the first UP device. This helps obtain a network service that meets the requirement, and improves network experience of the first user.

Optionally, step 201 and step 202 may be applied to a session establishment process of the first user, and/or applied to an established session of the first user. An example in which step 201 and step 202 are applied to the session establishment process of the first user is used. In an optional manner, refer to a dashed line part in FIG. 2. After step 202, the method in this embodiment of this application further includes step 203 and step 204, and step 203 and step 204 are applied to the established session of the first user.

203: The first device obtains second detection data and third detection data.

The first UP device and a second UP device are two UP devices in the CU separation communication system. For example, the first UP device and the second UP device are respectively the UP device 21 and the UP device 22 in the communication system shown in FIG. 1.

After the session of the first user is established, the first device obtains the second detection data of the network performance between the SF device and the first UP device, and obtains the third detection data of network performance between the SF device and the second UP device.

204: The first device configures the SF device and the second UP device based on the second detection data and the third detection data, to enable the first user to access the network through the SF device and the second UP device.

After the first device obtains the second detection data and the third detection data, the first device configures the SF device and the second UP device based on a fact that the second detection data does not meet the network performance requirement of the first user and the third detection data meets the network performance requirement of the first user, to enable the first user to access the network through the SF device and the second UP device.

After the first user accesses the network, because the second detection data does not meet the network performance requirement of the first user, and the third detection data meets the network performance requirement of the first user, the first device configures the SF device and the second UP device, to enable the first user to access the network through the SF device and the second UP device. This helps continue to obtain the network service that meets the requirement, and maintain good network experience of the first user.

In this embodiment of this application, in an optional manner, the first device may directly configure the SF device. Alternatively, in an optional manner, the first device may indicate another device to configure the SF device. Similarly, in an optional manner, the first device may directly configure the first UP device. Alternatively, in an optional manner, the first device may indicate another device to configure the first UP device.

The following separately describes network access methods in which the first device is an SDN controller, a CP device, and a USF device.

Figure 3:
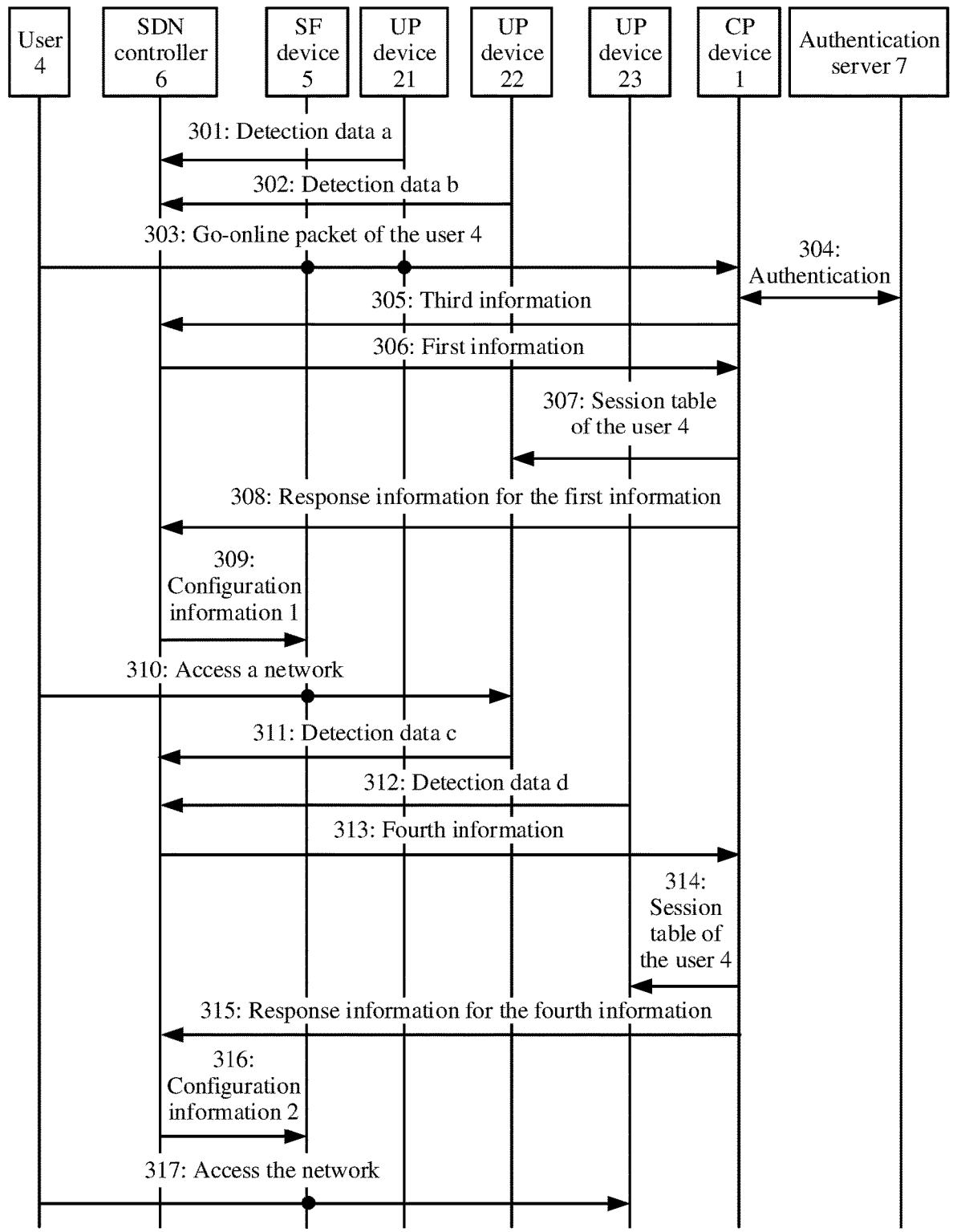

In an optional manner, the first device in the method shown in FIG. 2 is an SDN controller. In this case, optionally, the first device may directly configure the SF device, and indicate a CP device to configure the first UP device. With reference to FIG. 3, the following describes a network access method in this case by using an example. FIG. 3 is a schematic diagram of the network access method according to another embodiment of this application. The method shown in FIG. 3 is an example of the method shown in FIG. 2. Therefore, for some explanations of the method shown in FIG. 3, refer to the descriptions of the method shown in FIG. 2. The method shown in FIG. 3 includes steps 301 to 317. For ease of description, an example in which the method shown in FIG. 3 is applied to the communication system shown in FIG. 1 is used for description. An SDN controller 6 is connected to a CP device 1, and an example in which a first user is a user 4 is used for illustration.

301: The SDN controller 6 obtains detection data a from a UP device 21.

302: The SDN controller 6 obtains detection data b from a UP device 22.

In this embodiment of this application, it is assumed that an SF device 5 is currently configured to send a packet of the user 4 to the UP device 21. For example, it is assumed that the SF device 5 establishes a layer 2 tunnel T1 with an interface 1 (which is referred to as a UP interface 1) of the UP device 21 through an interface 1 (which is referred to as an SF interface 1) of the SF device 5, the SF device 5 establishes a layer 2 tunnel T2 with an interface 2 (which is referred to as a UP interface 2) of the UP device 22 through an interface 2 (which is referred to as an SF interface 2) of the SF device 5, and the SF device 5 establishes a layer 2 tunnel T3 with an interface 3 (which is referred to as a UP interface 3) of a UP device 23 through an interface 3 (which is referred to as an SF interface 3) of the SF device 5. It is assumed that a VLAN of the user 4 is currently configured on the SF interface 1.

The SDN controller 6 obtains the detection data a of network performance between the SF device 5 and the UP device 21, and obtains the detection data b of network performance between the SF device 5 and the UP device 22. FIG. 3 is illustrated by using an example in which the detection data a and the detection data b are respectively from the UP device 21 and the UP device 22.

Optionally, the detection data a is detection data of network performance of the layer 2 tunnel T1 between the SF device 5 and the UP device 21, and the detection data b is detection data of network performance of the layer 2 tunnel T2 between the SF device 5 and the UP device 22. Optionally, the SDN controller 6 obtains the detection data a and interface information (for example, information about the SF interface 1 and information about the UP interface 1) that correspond to the layer 2 tunnel T1, and the SDN controller 6 obtains the detection data b and interface information (for example, information about the SF interface 2 and information about the UP interface 2) that correspond to the layer 2 tunnel T1.

In an optional manner, the SDN controller 6 may further obtain detection data of the SF device 5 and another UP device in the CU separation communication system. For example, still refer to FIG. 1. The SDN controller 6 may further obtain detection data from the UP device 23. The detection data is detection data of network performance of the layer 2 tunnel T3 between the SF device 5 and the UP device 23.

303: The CP device 1 receives a go-online packet of the user 4.

Because the SF device 5 is currently configured to send the packet of the user 4 to the UP device 21, the go-online packet is sent to the CP device 1 through the SF device 5 and the UP device 21. For example, the SF device 5 sends the go-online packet to the UP device 21 through the layer 2 tunnel T1, and then the UP device 21 sends the go-online packet to the CP device 1.

304: An authentication server 7 performs authentication on the user 4.

After receiving the go-online packet of the user 4, the CP device 1 sends an authentication request for the user 4 to the authentication server 7. The authentication server 7 may perform authentication on the user 4, and feed back an authentication result to the CP device 1.

Optionally, the authentication server 7 may further send SLA information of the user 4 to the CP device 1. The SLA information includes a service level of the user 4. Optionally, if service levels of two users are different, the two users have different network performance requirements. For example, service levels of users may be classified into a gold user, a silver user, and a copper user. A network performance requirement of the gold user is higher than a network performance requirement of the silver user, and the network performance requirement of the silver user is higher than a network performance requirement of the copper user.

305: The CP device 1 sends third information to the SDN controller 6.

The third information is used to indicate that the user 4 is a user requesting to go online. Optionally, the third information carries identification information and the service level agreement (SLA) information of the user 4. Optionally, the third information may further carry interface information (namely, the information about the UP interface 1) of the UP device 21. The SLA information is used to determine the network performance requirement of the user.

306: The SDN controller 6 sends first information to the CP device 1 based on the third information, the detection data a, and the detection data b.

After obtaining the third information, the SDN controller 6 may determine the network performance requirement of the user 4 based on the third information (for example, the SLA information of the user 4 in the third information). The SDN controller 6 selects one UP device (which is referred to as a first UP device) from the UP device 21 and the UP device 22 based on the detection data a and the detection data b. Detection data of the first UP device meets the network performance requirement of the user 4.

The first information is used to indicate the CP device 1 to configure the first UP device, to connect a session of the user 4 to a network through the first UP device.

In FIG. 3, an example in which the first UP device is the UP device 22 is used for illustration. Optionally, the first information carries an identifier of the user 4 and interface information (namely, the information about the UP interface 2) of the UP device 22.

To reduce system overheads caused by UP device switching, in an optional manner, if both the detection data a and the detection data b meet the network performance requirement of the user 4, the SDN controller 6 may preferentially select the UP device 21 as the first UP device. Alternatively, if the detection data a does not meet the network performance requirement of the user 4, but the detection data b meets the network performance requirement of the user 4, the SDN controller 6 may select the UP device 22 as the first UP device.

307: The CP device 1 sends a session table of the user 4 to the UP device 22.

After receiving the first information, the CP device 1 may configure the UP device 22 according to an indication of the first information, for example, including but not limited to sending the session table of the user 4 to the UP device 22.

In addition, optionally, the CP device 1 may further allocate an IP address to the user 4, and the IP address is an IP address corresponding to the UP device 22.

308: The CP device 1 sends response information for the first information to the SDN controller 6.

After completing configuration of the UP device 22 according to the indication of the first information, the CP device 1 may send the response information for the first information to the SDN controller 6, to indicate that the CP device 1 has completed configuration of the UP device 22, and specifically indicate that the session table of the user 4 has been delivered to the UP device 22.

309: The SDN controller 6 sends configuration information 1 to the SF device 5 based on the third information, the detection data a, and the detection data b.

Refer to step 306. The SDN controller 6 may determine, based on the third information, the detection data a, and the detection data b, that detection data of the UP device 22 meets the network performance requirement of the user 4. After the CP device 1 completes configuration of the UP device 22, the SDN controller 6 may send the configuration information 1 to the SF device 5. The configuration information 1 is used to indicate the SF to connect the session of the user 4 to the UP device 22. The SF device 5 may perform configuration according to an indication of the configuration information 1, to migrate the session of the user 4 to the UP device 22.

For example, the configuration information 1 carries information about an original SF interface (namely, the information about the SF interface 1), information about an SF interface after steering (namely, the information about the SF interface 2), and the VLAN of the user 4. After receiving the configuration information 1, the SF device 5 may cancel configuration of the VLAN of the user 4 on the SF interface 1, and configure the VLAN of the user 4 on the SF interface 2, to send the packet of the user 4 to the UP device 22 through the layer 2 tunnel T2.

310: The user 4 accesses the network through the SF device 5 and the UP device 22.

After the SDN controller 6 completes configuration of the UP device 22 through the CP device 1 and completes configuration of the SF device 5, the user 4 may access the network through the SF device 5 and the UP device 22. Specifically, the packet of the user 4 is sent to the UP device 22 through the SF device 5, and then the UP device 22 sends the packet to a core network or the CP device 1.

311: The SDN controller 6 obtains detection data c from the UP device 22.

312: The SDN controller 6 obtains detection data d from the UP device 23.

Because detection data of network performance between the SF and a UP device may change, after step 310, the SDN controller 6 may obtain the detection data c of the network performance between the SF device 5 and the UP device 22 and the detection data d of network performance between the SF device 5 and the UP device 23.

FIG. 3 is illustrated by using an example in which the detection data c and the detection data d are respectively from the UP device 22 and the UP device 23. During actual application, the SDN controller 6 may further obtain detection data of the network performance of the layer 2 tunnel T1 between the SF device 5 and the UP device 21. If the detection data meets the network performance requirement of the user 4, the SDN controller 6 may select the UP device 21 as a second UP device.

For step 311 and step 312, refer to step 301 and step 302 for understanding. For example, optionally, the SDN controller 6 obtains the detection data c and the interface information (for example, the information about the SF interface 2 and the information about the UP interface 2) that correspond to the layer 2 tunnel T2, and the SDN controller 6 obtains the detection data d and interface information (for example, information about the SF interface 3 and information about the UP interface 3) that correspond to the layer 2 tunnel T3.

In an optional manner, the SDN controller 6 may further obtain detection data of the SF device 5 and another UP device in the CU separation communication system. For example, the SDN controller 6 may further obtain detection data from the UP device 21. The detection data is the detection data of the network performance of the layer 2 tunnel T1 between the SF device 5 and the UP device 21.

313: The SDN controller 6 sends fourth information to the CP device 1 based on the detection data c and the detection data d.

After the SDN controller 6 obtains the detection data c and the detection data d, the SDN controller 6 may select one UP device (which is referred to as the second UP device) from the UP device 22 and the UP device 23 based on the detection data c and the detection data d. Detection data of the second UP device meets the network performance requirement of the user 4. The fourth information is used to indicate the CP device 1 to configure the second UP device, to connect the session of the user 4 to the network through the second UP device.

FIG. 3 is illustrated by using an example in which the second UP device is the UP device 23. For example, the fourth information carries the identifier of the user 4 and interface information (namely, the information about the UP interface 3) of the UP device 23.

To reduce system overheads caused by UP device switching, in an optional manner, if both the detection data c and the detection data d meet the network performance requirement of the user 4, the SDN controller 6 may preferentially select the UP device 22 as the second UP device. Alternatively, if the detection data c does not meet the network performance requirement of the user 4, but the detection data d meets the network performance requirement of the user 4, the SDN controller 6 may select the UP device 23 as the second UP device.

314: The CP device 1 sends the session table of the user 4 to the UP device 23.

After receiving the fourth information, the CP device 1 may configure the UP device 23 according to an indication of the fourth information, for example, send the session table of the user 4 to the UP device 23.

315: The CP device 1 sends response information for the fourth information to the SDN controller 6.

After completing configuration of the UP device 23 according to the indication of the fourth information, the CP device 1 may send the response information for the fourth information to the SDN controller 6, to indicate that the CP device 1 has completed configuration of the UP device 23, and specifically indicate that the session table of the user 4 has been delivered to the UP device 23.

316: The SDN sends configuration information 2 to the SF device 5 based on first detection data.

Refer to step 313. The SDN controller 6 may determine, based on the detection data c and the detection data d, that detection data of the UP 23 meets the network performance requirement of the user 4. After the CP device 1 completes configuration of the UP device 23, the SDN controller 6 may send the configuration information 2 to the SF device 5. The configuration information 2 is used to indicate the SF to connect the session of the user 4 to the UP device 23. The SF device 5 may perform configuration according to an indication of the configuration information 2, to migrate the session of the user 4 to the UP device 23.

For example, the configuration information 2 carries information about an original SF interface (namely, the information about the SF interface 2), information about an SF interface after steering (namely, the information about the SF interface 3), and the VLAN of the user 4. After receiving the configuration information 2, the SF device 5 may cancel configuration of the VLAN of the user 4 on the SF interface 2, and configure the VLAN of the user 4 on the SF interface 3, to send the packet of the user 4 to the UP device 23 through the layer 2 tunnel T3.

317: The user 4 accesses the network through the SF device 5 and the UP device 23.

After the SDN controller 6 completes configuration of the UP device 23 through the CP device 1 and completes configuration of the SF device 5, the user 4 may access the network through the SF device 5 and the UP device 23. Specifically, the packet of the user 4 is sent to the UP device 23 through the SF device 5, and then the UP device 23 sends the packet to the core network or the CP device 1.

In the method shown in FIG. 3, an execution sequence of step 301 and step 302 is not limited, and an execution sequence of step 311 and step 312 is not limited. In the method shown in FIG. 3, step 301 and step 302 only need to be performed before step 306.

In addition, because this embodiment of this application is intended to select, for the first user, a UP device whose network performance meets a requirement, the method shown in FIG. 3 is not limited to step 301 and step 302, provided that the SDN controller 6 obtains the detection data that meets the network performance requirement of the user 4. For example, it is assumed that the detection data b meets the network performance requirement of the user 4. In this case, before step 306, the SDN controller 6 obtains only the detection data b, and may select the first UP device for the user 4 without obtaining the detection data a.

Step 301 to step 310 are used to select, for the user in a session establishment process, a UP device whose network performance meets the user requirement, to enable the user to access the network through the UP device. Step 305 is used to provide the identifier of the user 4 and the SLA information of the user 4 for the SDN controller 6. Optionally, step 305 may not be performed in the method shown in FIG. 3, and the SDN controller 6 obtains the identifier and the SLA information of the user 4 in the session establishment process in another manner.

If the CP device 1 fails to configure the UP device 22, configuring the SF device 5 by the SDN controller 6 easily results in that the user 4 cannot access the network. Step 308 is used to notify that the configuration of the UP device 22 is completed, and this helps increase a rate of successfully accessing the network by the user 4. In the method shown in FIG. 3, step 308 is not necessarily limited to being performed. Similarly, step 315 is used to notify that the configuration of the UP device 23 is completed. In the method shown in FIG. 3, step 315 is not necessarily limited to being performed.

Step 311 to step 317 are used to select, for the user that has established the session, a UP device whose network performance meets the user requirement, to enable the user to access the network through the UP device. Information and the SLA information of the user may be obtained and saved by the SDN controller 6 by using step 305. Optionally, the SDN controller 6 may obtain, in another manner, the identifier and the SLA information of the user that has established the session.

The method shown in FIG. 3 may be applied to the session establishment process of the user, and may be applied to the established session of the user. Optionally, the method shown in FIG. 3 may be applied only to the session establishment process of the user. For example, in this case, step 311 to step 317 may not be performed. Alternatively, the method shown in FIG. 3 may be applied only to the established session of the user. For example, in this case, step 301 to step 310 may not be performed.

Figure 4:
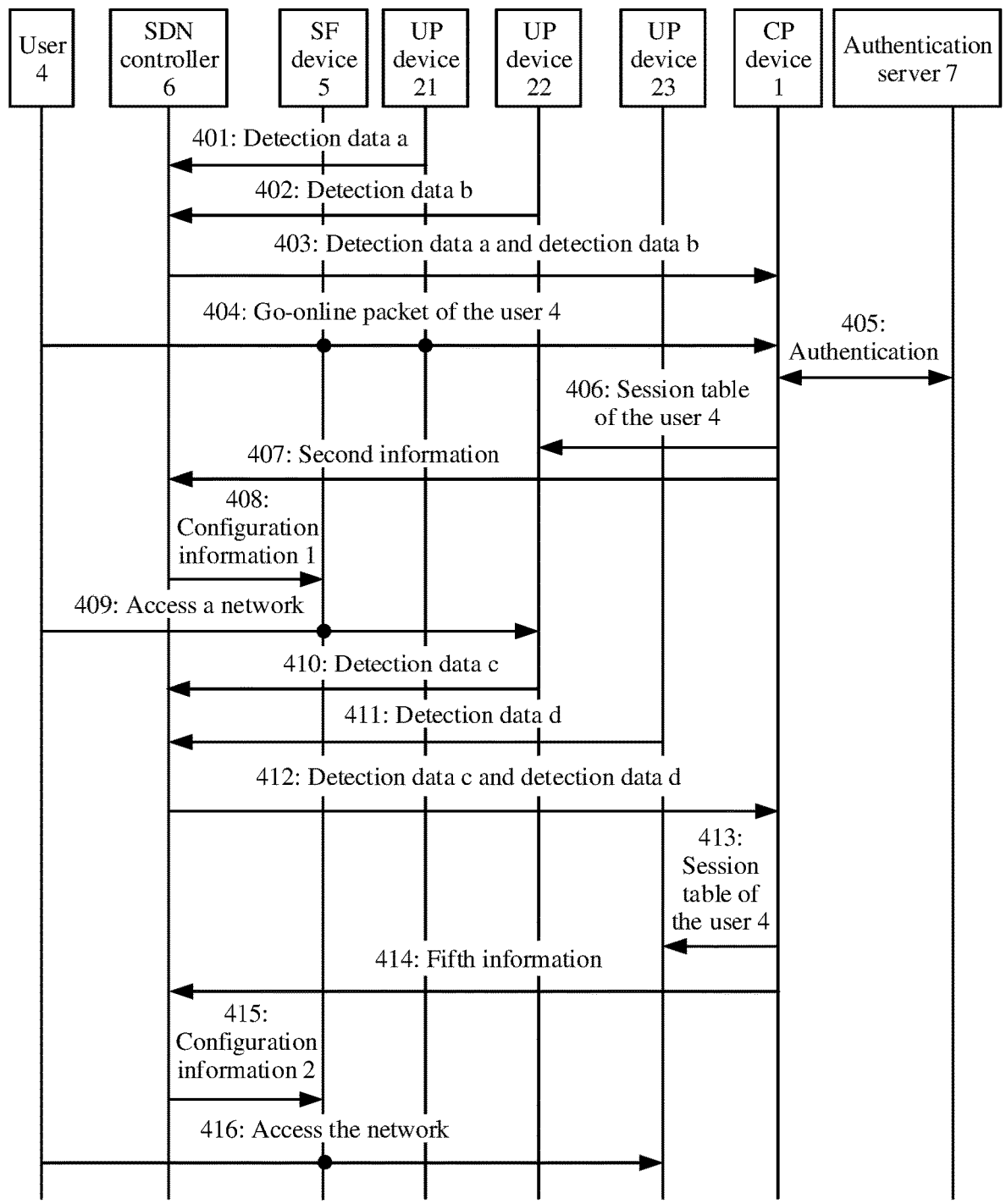

In an optional manner, the first device in the method shown in FIG. 2 is a CP device. In this case, optionally, the first device may directly configure the UP device, and indicate an SDN controller to configure the SF device. With reference to FIG. 4, the following describes a network access method in this case by using an example. FIG. 4 is a schematic diagram of the network access method according to another embodiment of this application. The method shown in FIG. 4 is an example of the method shown in FIG. 2. Therefore, for some explanations of the method shown in FIG. 4, refer to the descriptions of the method shown in FIG. 2. The method shown in FIG. 4 includes steps 401 to 416. For ease of description, an example in which the method shown in FIG. 4 is applied to the communication system shown in FIG. 1 is used for description. An SDN controller 6 is connected to a CP device 1, and an example in which a first user is a user 4 is used for illustration.

401: The SDN controller 6 obtains detection data a from a UP device 21.

402: The SDN controller 6 obtains detection data b from a UP device 22.

403: The CP device 1 obtains the detection data a and the detection data b from the SDN controller 6.

The CP device 1 obtains the detection data a of network performance between an SF device 5 and the UP device 21, and obtains the detection data b of network performance between the SF device 5 and the UP device 22. FIG. 4 is illustrated by using an example in which both the detection data a and the detection data b that are obtained by the CP device 1 are from the SDN controller 6.

For descriptions of the detection data a and the detection data b, refer to related descriptions of step 301 and step 302. Details are not described herein again.

404: The CP device 1 receives a go-online packet of the user 4.

405: An authentication server 7 performs authentication on the user 4.

For step 404 and step 405, refer to related descriptions of step 303 and step 304 for understanding. Details are not described herein again.

406: The CP device 1 sends a session table of the user 4 to the UP device 22 based on the detection data a and the detection data b.

The CP device 1 selects one UP device (which is referred to as a first UP device) from the UP device 21 and the UP device 22 based on the detection data a and the detection data b. Detection data of the first UP device meets a network performance requirement of the user 4. The CP device 1 may configure the first UP device, for example, including but not limited to sending the session table of the user 4 to the first UP device.

In FIG. 4, an example in which the first UP device is the UP device 22 is used for illustration.

To reduce system overheads caused by UP device switching, in an optional manner, if both the detection data a and the detection data b meet the network performance requirement of the user 4, the CP device 1 may preferentially select the UP device 21 as the first UP device. Alternatively, if the detection data a does not meet the network performance requirement of the user 4, but the detection data b meets the network performance requirement of the user 4, the CP device 1 may select the UP device 22 as the first UP device.

407: The CP device 1 sends second information to the SDN controller 6 based on the detection data a and the detection data b.

Refer to step 406. The CP device 1 may determine, based on the detection data a and the detection data b, that detection data of the UP device 22 meets the network performance requirement of the user 4. After sending the session table of the user 4 to the UP device 22, the CP device 1 indicates the SDN controller 6 to configure the SF device 5. For example, the CP device 1 sends the second information to the SDN controller 6. The second information is used to indicate the SDN controller to send configuration information to the SF device. The configuration information is used to indicate the SF device to connect a session of the first user to the UP device 22.

408: The SDN controller 6 sends configuration information 1 to the SF device 5 based on the second information.

409: The user 4 accesses a network through the SF device 5 and the UP device 22.

For step 408 and step 409, refer to related descriptions of step 309 and step 310 for understanding. Details are not described herein again.

410: The SDN controller 6 obtains detection data c from the UP device 21.

411: The SDN controller 6 obtains detection data d from the UP device 22.

412: The CP device 1 obtains the detection data c and the detection data d from the SDN controller 6.

Because detection data of network performance between the SF and a UP device may change, after step 409, the CP device 1 may obtain the detection data c of the network performance between the SF device 5 and the UP device 22 and the detection data d of network performance between the SF device 5 and the UP device 23.

For descriptions of the detection data c and the detection data d, refer to related descriptions of step 311 and step 312. Details are not described herein again.

413: The CP device 1 sends the session table of the user 4 to the UP device 23 based on the detection data c and the detection data d.

After the SDN controller 6 obtains the detection data c and the detection data d, the SDN controller 6 may select one UP device (which is referred to as a second UP device) from the UP device 22 and the UP device 23 based on the detection data c and the detection data d. Detection data of the second UP device meets the network performance requirement of the user 4. The CP device 1 may configure the second UP device, for example, including but not limited to sending the session table of the user 4 to the second UP device.

FIG. 4 is illustrated by using an example in which the second UP device is the UP device 23. During actual application, the CP device 1 may further obtain detection data of network performance of a layer 2 tunnel T1 between the SF device 5 and the UP device 21. If the detection data meets the network performance requirement of the user 4, the CP device 1 may select the UP device 21 as the second UP device.

To reduce system overheads caused by UP device switching, in an optional manner, if both the detection data c and the detection data d meet the network performance requirement of the user 4, the CP device 1 may preferentially select the UP device 22 as the second UP device. Alternatively, if the detection data c does not meet the network performance requirement of the user 4, but the detection data d meets the network performance requirement of the user 4, the CP device 1 may select the UP device 23 as the second UP device.

414: The CP device 1 sends fifth information to the SDN controller 6 based on the detection data c and the detection data d.

Refer to step 413. The CP device 1 may determine, based on the detection data c and the detection data d, that detection data of the UP device 23 meets the network performance requirement of the user 4. After sending the session table of the user 4 to the UP device 23, the CP device 1 indicates the SDN controller 6 to configure the SF device 5. For example, the CP device 1 sends the fifth information to the SDN controller 6. The fifth information is used to indicate the SDN controller to send configuration information to the SF device. The configuration information is used to indicate the SF device to connect the session of the first user to the UP device 23.

415: The SDN controller 6 sends configuration information 2 to the SF device 5 based on the fifth information.

416: The user 4 accesses the network through the SF device 5 and the UP device 23.

For step 415 and step 416, refer to related descriptions of step 316 and step 317 for understanding. Details are not described herein again.

In the method shown in FIG. 4, an execution sequence of step 401 and step 402 is not limited, and an execution sequence of step 410 and step 411 is not limited. In the method shown in FIG. 4, step 401, step 402, and step 403 are not limited to being performed before step 404, provided that step 401, step 402, and step 403 are performed before step 406.

In addition, because this embodiment of this application is intended to select, for the first user, a UP device whose network performance meets a requirement, the method shown in FIG. 4 is not limited to step 401 and step 402, provided that the CP device 1 obtains the detection data that meets the network performance requirement of the user 4. For example, it is assumed that the detection data b meets the network performance requirement of the user 4. In this case, before step 406, the CP device 1 obtains only the detection data b, and may select the first UP device for the user 4 without obtaining the detection data a.

Step 401 to step 409 are used to select, for the user in a session establishment process, a UP device whose network performance meets the user requirement, to enable the user to access the network through the UP device. Step 410 to step 416 are used to select, for the user that has established a session, a UP device whose network performance meets the user requirement, to enable the user to access the network through the UP device. The method shown in FIG. 4 may be applied to the session establishment process of the user, and may be applied to the established session of the user. Optionally, the method shown in FIG. 4 may be applied only to the session establishment process of the user. For example, in this case, step 410 to step 416 may not be performed. Alternatively, the method shown in FIG. 4 may be applied only to the established session of the user. For example, in this case, step 401 to step 409 may not be performed.

Figure 5A:
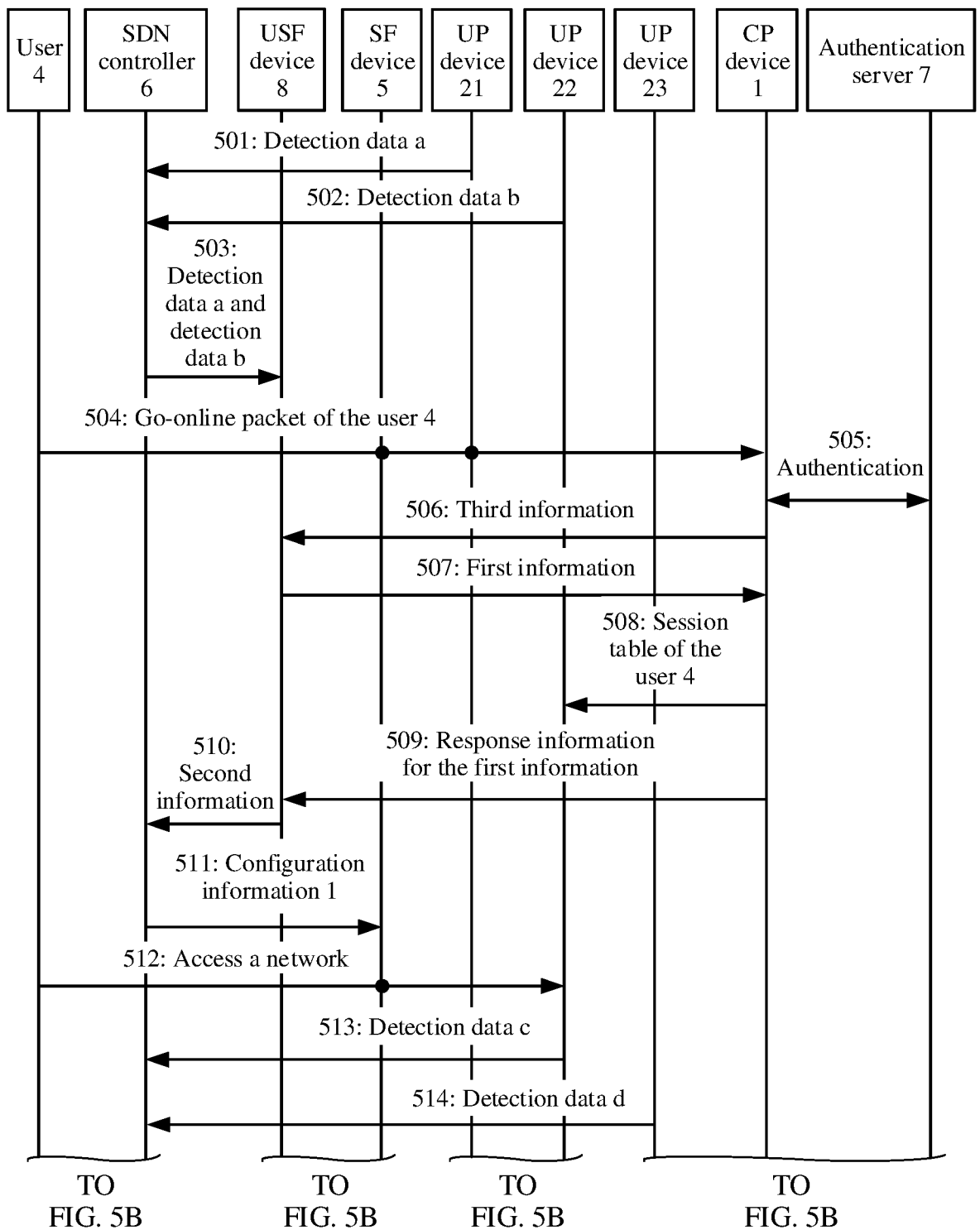
Figure 5B:
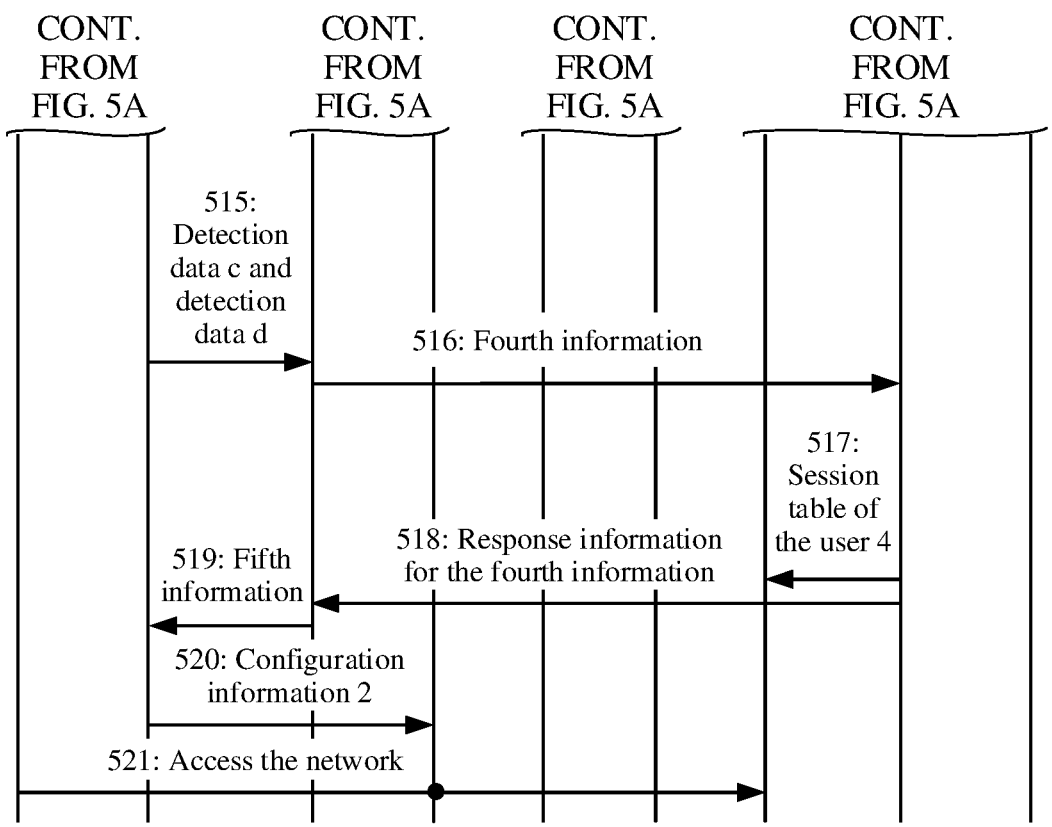

In an optional manner, the first device in the method shown in FIG. 2 is a USF device. In this case, optionally, the first device may indicate a CP device to configure the UP device, and indicate an SDN controller to configure the SF device. With reference to FIG. 5A and FIG. 5B, the following describes a network access method in this case by using an example. FIG. 5A and FIG. 5B are a schematic diagram of the network access method according to another embodiment of this application. The method shown in FIG. 5A and FIG. 5B is an example of the method shown in FIG. 2. Therefore, for some explanations of the method shown in FIG. 5A and FIG. 5B, refer to the descriptions of the method shown in FIG. 2. The method shown in FIG. 5A and FIG. 5B includes steps 501 to 521. For ease of description, an example in which the method shown in FIG. 5A and FIG. 5B is applied to the communication system shown in FIG. 1 is used for description. The communication system shown in FIG. 1 includes a USF device 8. The USF device 8 is separately connected to an SDN controller 6 and a CP device 1. The SDN controller 6 may not be connected to the CP device 1. In addition, an example in which a first user is a user 4 is used for illustration.

501: The SDN controller 6 obtains detection data a from a UP device 21.

502: The SDN controller 6 obtains detection data b from a UP device 22.

503: The USF device 8 obtains the detection data a and the detection data b from the SDN controller 6.

The USF device 8 obtains the detection data a of network performance between an SF device 5 and the UP device 21, and obtains the detection data b of network performance between the SF device 5 and the UP device 22. FIG. 5A and FIG. 5B are illustrated by using an example in which both the detection data a and the detection data b that are obtained by the USF device 8 are from the SDN controller 6.

For descriptions of the detection data a and the detection data b, refer to related descriptions of step 301 and step 302. Details are not described herein again.

504: The CP device 1 receives a go-online packet of the user 4.

505: An authentication server 7 performs authentication on the user 4.

For step 504 and step 505, refer to related descriptions of step 303 and step 304 for understanding. Details are not described herein again.

506: The CP device 1 sends third information to the USF device 8.

507: The USF device 8 sends first information to the CP device 1 based on the third information, the detection data a, and the detection data b.

508: The CP device 1 sends a session table of the user 4 to the UP device 22.

509: The CP device 1 sends response information for the first information to the USF device 8.

For step 504 to step 509, refer to related descriptions of step 303 to step 308 for understanding. Details are not described herein again.

510: The USF device 8 sends second information to the SDN controller 6 based on the detection data a and the detection data b.

After the USF device 8 determines, based on the detection data a and the detection data b, that detection data of the UP device 22 meets a network performance requirement of the user 4, the USF device 8 indicates the SDN controller 6 to configure the SF device 5. For example, the USF device 8 sends the second information to the SDN controller 6. The second information is used to indicate the SDN controller to send configuration information to the SF device. The configuration information is used to indicate the SF device to connect a session of the first user to the UP device 22.

511: The SDN controller 6 sends configuration information 1 to the SF device 5 based on the second information.

512: The user 4 accesses a network through the SF device 5 and the UP device 22.

For step 511 and step 512, refer to related descriptions of step 309 and step 310 for understanding. Details are not described herein again.

513: The SDN controller 6 obtains detection data c from the UP device 21.

514: The SDN controller 6 obtains detection data d from the UP device 22.

515: The USF device 8 obtains the detection data c and the detection data d from the SDN controller 6.

For step 513 to step 515, refer to step 410 to step 412 for understanding. Details are not described herein again.

516: The USF device 8 sends fourth information to the CP device 1 based on the detection data c and the detection data d.

517: The CP device 1 sends the session table of the user 4 to the UP device 23.

518: The CP device 1 sends response information for the fourth information to the SDN controller 6.

For step 516 to step 518, refer to related descriptions of step 313 to step 315 for understanding. Details are not described herein again.

519: The USF device 8 sends fifth information to the SDN controller 6 based on the detection data c and the detection data d.

520: The SDN controller 6 sends configuration information 2 to the SF device 5 based on the fifth information.

521: The user 4 accesses the network through the SF device 5 and the UP device 23.

For step 519 to step 521, refer to related descriptions of step 414 to step 416 for understanding. Details are not described herein again.

In the method shown in FIG. 5A and FIG. 5B, an execution sequence of step 501 and step 502 is not limited, and an execution sequence of step 513 and step 514 is not limited. In the method shown in FIG. 5A and FIG. 5B, step 501, step 502, and step 503 only need to be performed before step 507.

In addition, because this embodiment of this application is intended to select, for the first user, a UP device whose network performance meets a requirement, the method shown in FIG. 3 is not limited to step 501 and step 502, provided that the USF device 8 obtains the detection data that meets the network performance requirement of the user 4. For example, it is assumed that the detection data b meets the network performance requirement of the user 4. In this case, before step 507, the USF device 8 obtains only the detection data b, and may select the first UP device for the user 4 without obtaining the detection data a.

Step 501 to step 512 are used to select, for the user in a session establishment process, a UP device whose network performance meets the user requirement, to enable the user to access the network through the UP device. Step 506 is used to provide an identifier of the user 4 and SLA information of the user 4 for the USF device 8. Optionally, step 506 may not be performed in the method shown in FIG. 5A and FIG. 5B, and the USF device 8 obtains the identifier and the SLA information of the user 4 in the session establishment process in another manner.

Step 509 is used to notify that configuration of the UP device 22 is completed. If the CP device 1 fails to configure the UP device 22, indicating, by the USF device 8, the SDN controller 6 to configure the SF device 5 easily results in that the user 4 cannot access the network. In the method shown in FIG. 5A and FIG. 5B, step 509 is not necessarily limited to being performed. Similarly, step 518 is used to notify that configuration of the UP device 23 is completed. In the method shown in FIG. 5A and FIG. 5B, step 518 is not necessarily limited to being performed.

Step 513 to step 521 are used to select, for the user that has established a session, a UP device whose network performance meets the user requirement, to enable the user to access the network through the UP device. Information and the SLA information of the user may be obtained and saved by the USF device 8 by using step 506. Optionally, the USF device 8 may obtain, in another manner, the identifier and the SLA information of the user that has established the session.

The method shown in FIG. 5A and FIG. 5B may be applied to the session establishment process of the user, and may be applied to the established session of the user. Optionally, the method shown in FIG. 5A and FIG. 5B may be applied only to the session establishment process of the user. For example, in this case, step 513 to step 521 may not be performed. Alternatively, the method shown in FIG. 5A and FIG. 5B may be applied only to the established session of the user. For example, in this case, step 501 to step 512 may not be performed.

Figure 6:
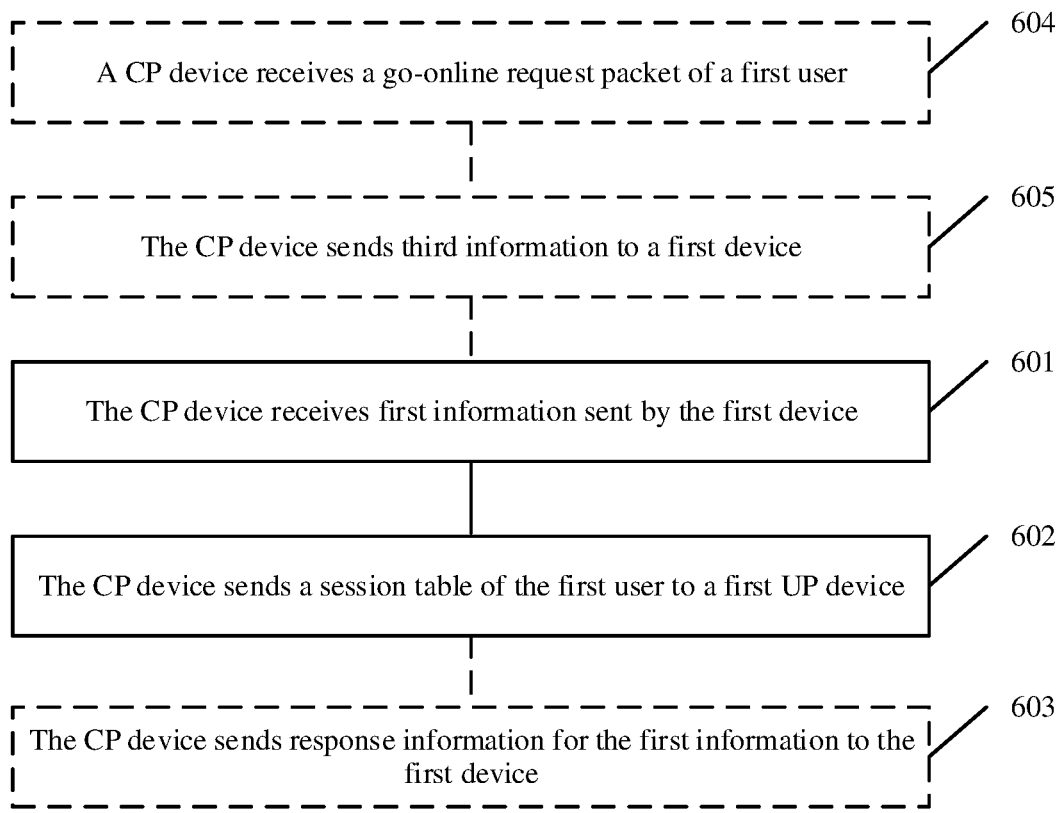

FIG. 6 is a flowchart of a network access method according to another embodiment of this application. The method in the embodiment corresponding to FIG. 6 may be applied to the communication system shown in FIG. 1, or may be applied to another communication system. This is not limited in this embodiment of this application. Optionally, a first device in the network access method shown in FIG. 6 may be an execution body (namely, the first device) of the method shown in FIG. 2, or the SDN controller in the method shown in FIG. 3, or the USF device in the method shown in FIG. 5A and FIG. 5B. Refer to FIG. 6. The network access method in this embodiment of this application includes step 601 and step 602.

601: A CP device receives first information sent by the first device.

The CP device is a CP device (for example, the CP device 1 in FIG. 1) in a CU separation communication system. A first UP device is a UP device (for example, the UP device 22 in FIG. 1) in the communication system.

The first information is used to indicate that a first user corresponds to the first UP device in the communication system. Detection data of network performance between an SF device and the first UP device meets a network performance requirement of the first user.

602: The CP device sends a session table of the first user to the first UP device.

For step 602, refer to step 307 for understanding. Details are not described herein again.

In an optional manner, refer to a dashed line part in FIG. 6. After step 602, the method shown in FIG. 6 may further include step 603.

603: The CP device sends response information for the first information to the first device.

The response information for the first information is used to indicate that the session table of the first user has been delivered to the first UP device. The first device configures the SF device based on the response information. This helps increase a rate of successfully accessing a network by the user 4.

In an optional manner, still refer to the dashed line part in FIG. 6. Before step 601, the method shown in FIG. 6 may further include step 604 and step 605.

604: The CP device receives a go-online request packet of the first user.

605: The CP device sends third information to the first device.

The third information is used to request the first device to determine a UP device in the communication system corresponding to the first user. Between step 604 and step 605, the CP device may further request an authentication server to perform authentication on the first user.

For step 604 and step 605, refer to step 303 and step 305 for understanding. Details are not described herein again.

Figure 7:
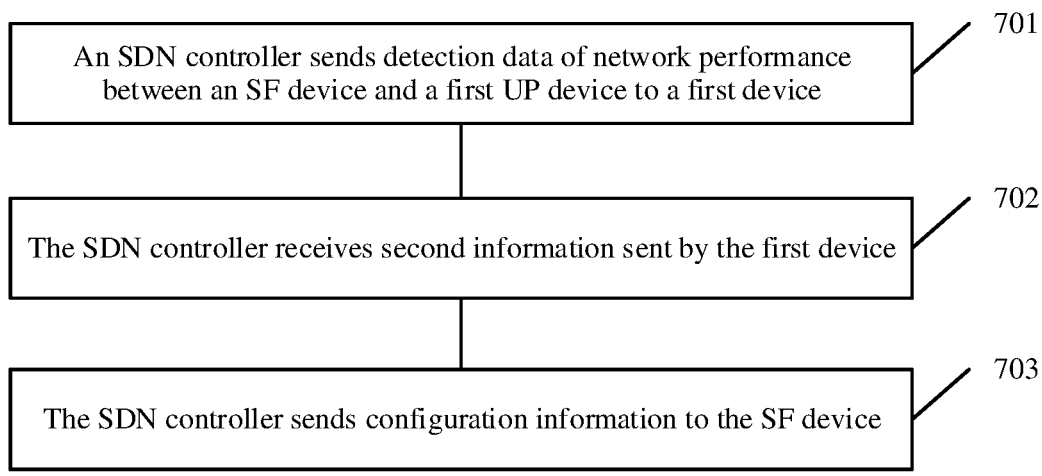
FIG. 7 to FIG. 12 are schematic diagrams of structures of network apparatuses according to embodiments of this application.

FIG. 7 is a flowchart of a network access method according to another embodiment of this application. The method in the embodiment corresponding to FIG. 7 may be applied to the communication system shown in FIG. 1, or may be applied to another communication system. This is not limited in this embodiment of this application. Optionally, a first device in the network access method shown in FIG. 7 may be an execution body (namely, the first device) of the method shown in FIG. 2, or the CP device in the method shown in FIG. 4, or the USF device in the method shown in FIG. 5A and FIG. 5B. Refer to FIG. 7. The network access method in this embodiment of this application includes step 701 and step 702.

701: An SDN controller sends detection data of network performance between an SF device and a first UP device to the first device.

The first UP device is a UP device in a CU separation communication system.

Optionally, the detection data is detection data of network performance of a layer 2 tunnel between the SF device and the first UP device.

702: The SDN controller receives second information sent by the first device.

The second information is used to indicate that a first user corresponds to the first UP device. The detection data of the network performance between the SF device and the first UP meets a network performance requirement of the first user.

For step 702, refer to step 407 for understanding. Details are not described herein again.

703: The SDN controller sends configuration information to the SF device.

The configuration information is used to indicate the SF to connect a session of the first user to the first UP device.

For step 702, refer to step 309 for understanding. Details are not described herein again.

In an optional manner, in the network access method shown in FIG. 7, step 702 and step 703 may not be performed. The SDN controller sends the detection data of the network performance between the SF device and the first UP device to the first device. This helps the first device select, for the first user, a UP device that meets the requirement and configure the first user to access a network through the UP device, and ensures network use experience of the first user.

In an optional manner, in the network access method shown in FIG. 7, step 701 may not be performed. The SDN controller performs step 702 and step 703. This helps configure, according to an indication of the first device, the first UP device that meets the requirement of the first user, helps the first user access the network through the first UP device, and ensures the network use experience of the first user.

The foregoing describes the network access methods in embodiments of this application, and the following describes a structure of a network apparatus in this application. The network apparatus may be the first device in the method shown in FIG. 2, or the SDN controller or the CP device in the method shown in FIG. 3, or the CP device or the SDN controller in the method shown in FIG. 4, or the USF device or the SDN controller or the CP device in the method shown in FIG. 5A and FIG. 5B, or the CP device in the method shown in FIG. 6, or the SDN controller in the method shown in FIG. 7. Alternatively, the network apparatus may be an apparatus that can be used together with a corresponding device. The network apparatus may be installed in the corresponding device. For example, the network apparatus may be a chip system. In embodiments of this application, the chip system may include a chip, or may include a chip and another discrete component.

Figure 8:
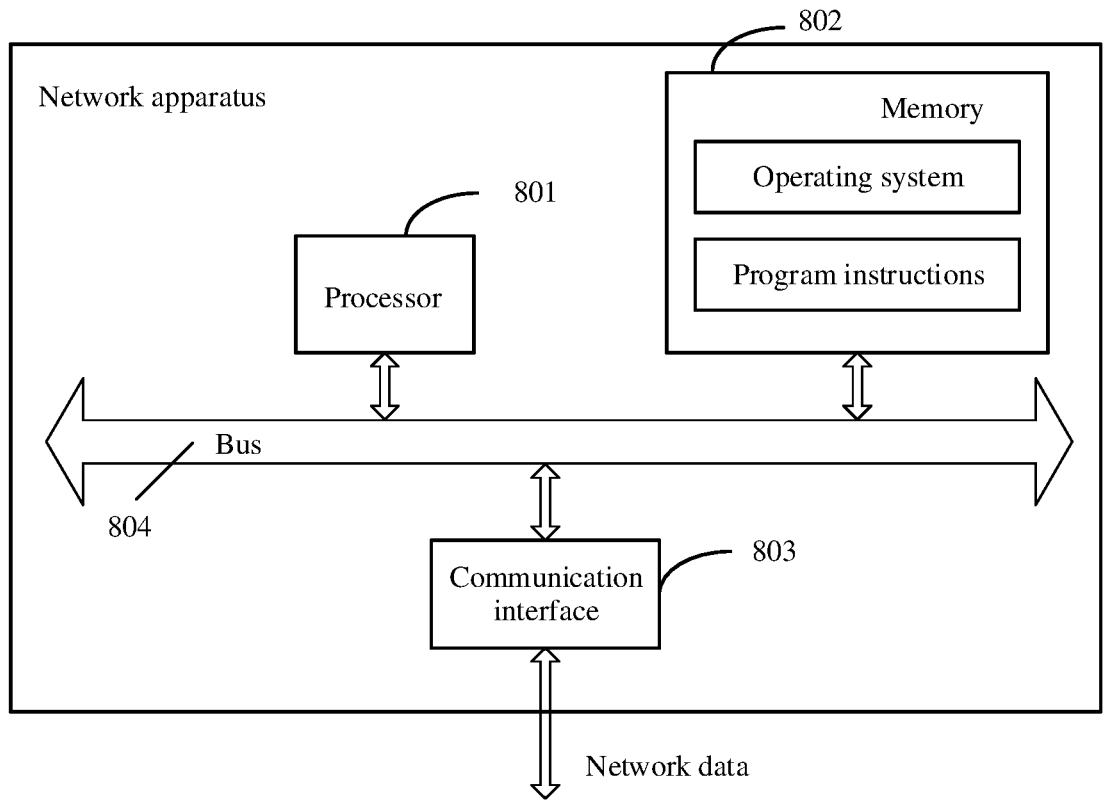

FIG. 8 is a schematic diagram of a structure of a network apparatus according to an embodiment of this application. Refer to FIG. 8. The network apparatus includes a processor 801 and a memory 802.

The processor 801 may be one or more CPUs, and the CPU may be a single-core CPU, or may be a multi-core CPU.

The memory 802 includes but is not limited to a random access memory (RAM), a read-only memory (ROM), an erasable programmable read-only memory (EPROM), a flash memory, an optical memory, or the like. The memory 802 stores code of an operating system and program instructions.

Optionally, the network apparatus further includes a communication interface 803. The communication interface 803 may be a wired interface, for example, a fiber distributed data interface (FDDI) or a gigabit Ethernet (GE) interface. Alternatively, the communication interface 803 may be a wireless interface. The communication interface 803 is configured to receive network data from an internal network and/or an external network.

Optionally, the network apparatus further includes a bus 804. The processor 801 and the memory 802 are usually connected to each other through the bus 804, or may be connected to each other in another manner.

Optionally, the processor 801 implements the network access method in embodiments of this application by reading the program instructions stored in the memory 802. Alternatively, the processor 801 may implement the network access method in embodiments of this application by using internally stored program instructions. For example, the processor 801 performs, based on the instructions stored in the memory 802, the steps in the method shown in FIG. 2, the steps performed by the SDN controller or the CP device in the method shown in FIG. 3, the steps performed by the CP device or the SDN controller in the method shown in FIG. 4, the steps performed by the USF device, the SDN controller, or the CP device in the method shown in FIG. 5A and FIG. 5B, the steps in the method shown in FIG. 6, or the steps in the method shown in FIG. 7. For more details about implementing the foregoing steps by the processor 801, refer to the descriptions in the foregoing method embodiments. Details are not described herein again.

Figure 9:
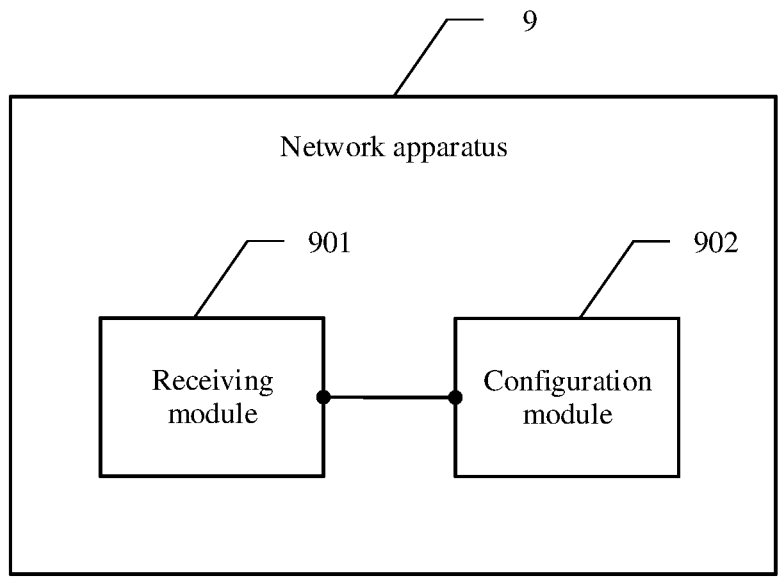

An embodiment of this application further provides a network apparatus. FIG. 9 is a schematic diagram of a structure of the network apparatus according to this embodiment of this application. Refer to FIG. 9. The network apparatus 9 includes a receiving module 901 and a configuration module 902. For example, the receiving module 901 is configured to perform step 201, step 203, step 301, step 302, step 305, step 308, step 311, step 312, step 315, step 403, step 404, step 412, step 503, step 506, step 509, step 515, step 518, or the like. The configuration module 902 is configured to perform step 202, step 204, step 305, step 309, step 313, step 316, step 406, step 407, step 413, step 414, step 507, step 510, step 516, step 519, or the like. For a specific execution process, refer to the detailed descriptions of the corresponding steps in the foregoing method embodiments. Details are not described herein again.

Figure 10:
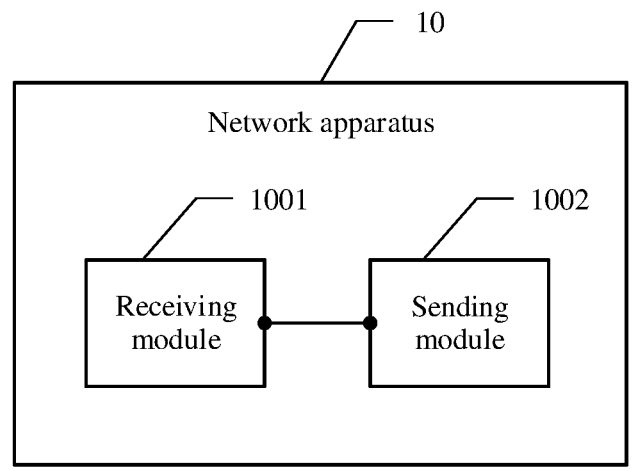

An embodiment of this application further provides a network apparatus. FIG. 10 is a schematic diagram of a structure of the network apparatus according to this embodiment of this application. Refer to FIG. 10. The network apparatus 10 includes a receiving module 1001 and a sending module 1002. For example, the receiving module 1001 is configured to perform step 303, step 306, step 313, step 504, step 507, step 516, step 601, step 604, or the like. The sending module 1002 is configured to perform step 605, step 307, step 308, step 314, step 315, step 506, step 508, step 509, step 517, step 518, step 602, step 603, step 605, or the like. For a specific execution process, refer to the detailed descriptions of the corresponding steps in the foregoing method embodiments. Details are not described herein again.

Figure 11:
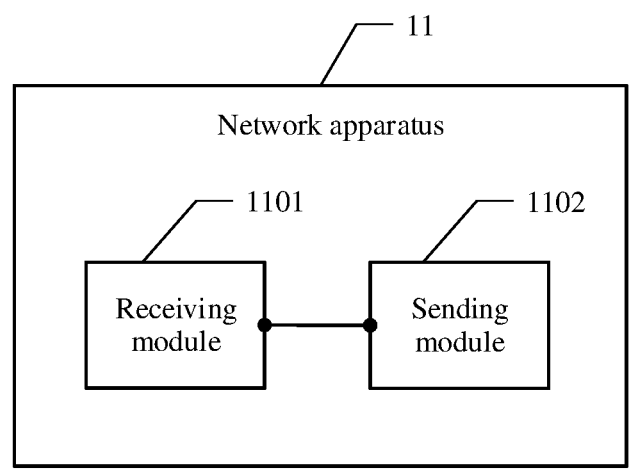

An embodiment of this application further provides a network apparatus. FIG. 11 is a schematic diagram of a structure of the network apparatus according to this embodiment of this application. Refer to FIG. 11. The network apparatus 11 includes a receiving module 1101 and a sending module 1102. For example, the receiving module 1101 is configured to perform step 401, step 402, step 407, step 410, step 411, step 414, step 501, step 502, step 510, step 513, step 514, step 519, step 702, or the like. The sending module 1102 is configured to perform step 403, step 408, step 412, step 415, step 503, step 511, step 515, step 520, step 703, or the like. For a specific execution process, refer to the detailed descriptions of the corresponding steps in the foregoing method embodiments. Details are not described herein again.

Figure 12:
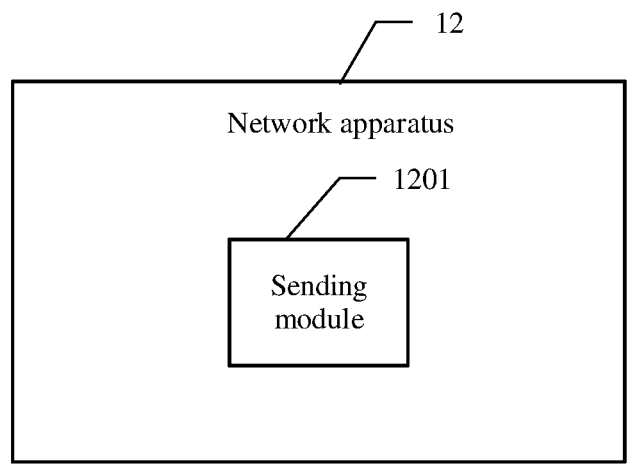

An embodiment of this application further provides a network apparatus. FIG. 12 is a schematic diagram of a structure of the network apparatus according to this embodiment of this application. Refer to FIG. 12. The network apparatus 12 includes a sending module 1201. For example, the sending module 1201 is configured to perform step 403, step 412, step 503, step 515, or step 701. For a specific execution process, refer to the detailed descriptions of the corresponding steps in the foregoing method embodiments. Details are not described herein again.

The coupling in embodiments of this application may be an indirect coupling or a communication connection between apparatuses, units, or modules in an electrical form, a mechanical form, or another form, and is used for information exchange between the apparatuses, the units, or the modules.

The apparatus embodiments described in FIG. 9 to FIG. 12 are merely examples. The modules in FIG. 9 to FIG. 12 may be implemented in a form of hardware, or may be implemented in a form of a software functional unit. For example, when software is used for implementation, the receiving module 901 and the configuration module 902 in the apparatus shown in FIG. 9 may be implemented by one or more software functional modules generated after the processor 801 reads the program instructions stored in the memory 802. In embodiments of this application, module division is an example, and is merely logical function division. During actual implementation, another division manner may be used. The modules in FIG. 9, FIG. 10, FIG. 11, or FIG. 12 may be separately implemented by different hardware in the network apparatuses. For example, the receiving module 901 is implemented by the communication interface 803 in FIG. 8, and the configuration module 902 is jointly implemented by the processor 801 and the network interface 803 in FIG. 8. It is clear that the foregoing functional module may alternatively be implemented by using a combination of software and hardware. For example, the receiving module 901 is implemented by the communication interface 803, and the configuration module 902 is a software functional module generated after the processor 801 reads the program instructions stored in the memory 802.

For technical effects that can be implemented by the network apparatuses shown in FIG. 9, FIG. 10, FIG. 11, and FIG. 12 and more details of implementing the foregoing functions by the modules, refer to corresponding descriptions in the foregoing method embodiments. Details are not described herein again.

Figure 13:
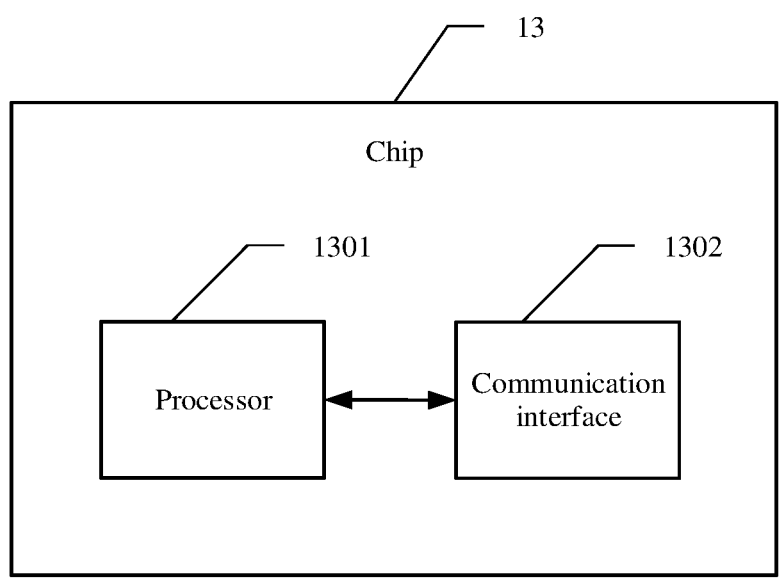
FIG. 13 is a schematic diagram of a structure of a chip according to an embodiment of this application.

Refer to FIG. 13. An embodiment of this application further provides a chip 13. The chip 13 includes a processor 1301 and a communication interface 1302. The communication interface 1302 is coupled to the processor 1301. The processor 1301 is configured to run a computer program or instructions, to implement the method provided in any one of the foregoing method embodiments of this application.

In an example, the communication interface 1302 (or referred to as an interface circuit) may be, for example, an input/output interface, a pin, or a circuit on the chip 13. The processor 1301 may execute computer instructions stored in a memory, to enable the chip 13 to perform any one of the foregoing method embodiments. Optionally, the memory may be a storage unit in the chip 13, for example, a register or a cache. Alternatively, the memory may be a memory that is in a computer device and that is located outside the chip 13, for example, a read-only memory (ROM) or another type of static storage device that can store static information and instructions, or a random access memory (RAM). Optionally, the processor 1301 may be a general-purpose central processing unit (CPU), a microprocessor, an application-specific integrated circuit (ASIC), or one or more integrated circuits configured to control program execution of any one of the foregoing method embodiments.

All or a part of the foregoing embodiments may be implemented by using software, hardware, firmware, or any combination thereof. When the software is used for implementation, all or a part of the embodiments may be implemented in a form of a computer program product.

The computer program product includes one or more computer instructions. When the computer-executable instructions are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

An embodiment of this application further provides a communication system. The communication system may include a first device, an SF device, and a UP device. The first device is configured to perform the method shown in FIG. 2.

An embodiment of this application further provides a communication system. The communication system includes a first device, an SDN controller, and a CP device. The first device is configured to perform the method shown in FIG. 2, the CP device performs the method shown in FIG. 6, and the SDN controller performs the method shown in FIG. 7.

An embodiment of this application further provides a communication system. The communication system includes an SDN controller and a CP device. The SDN controller performs the method performed by the SDN controller 6 shown in FIG. 3, and the CP device performs the method performed by the CP device 1 shown in FIG. 3. Alternatively, the CP device performs the method performed by the CP device 1 shown in FIG. 4, and the SDN controller performs the method performed by the SDN controller 6 shown in FIG. 4. For example, for the communication system in this case, refer to the SDN controller 6 and the CP device 1 in FIG. 1 for understanding.

An embodiment of this application further provides a communication system. The communication system includes an SDN controller, a CP device, and a USF device. The USF device performs the method performed by the USF device 8 shown in FIG. 5A and FIG. 5B, the SDN controller performs the method performed by the SDN controller 6 shown in FIG. 5A and FIG. 5B, and the CP device performs the method performed by the CP device 1 shown in FIG. 5A and FIG. 5B. For example, for the communication system in this case, refer to the USF device 8, the SDN controller 6, and the CP device 1 in FIG. 1 for understanding.

In embodiments of this application, at least one means one or more, and a plurality of means two or more. This is not limited in this application. In embodiments of this application, "/" may represent an "or" relationship between associated objects. For example, A/B may represent A or B. "And/or" may be used to indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

Embodiments in this specification are all described in a progressive manner, for same or similar parts in embodiments, reference may be made to these embodiments, and each embodiment focuses on a difference from other embodiments. Especially, a system embodiment is basically similar to a method embodiment, and therefore is described briefly. For related parts, refer to partial descriptions in the method embodiment.

A person of ordinary skill in the art may understand that when software is used to implement the aspects or possible implementations of the aspects in embodiments of this application, all or a part of the aspects or the possible implementations of the aspects may be implemented in a form of a computer program product. The computer program product refers to computer-readable instructions stored in a computer-readable medium. When the computer instructions are loaded and executed on a computer, the procedures or functions according to embodiments of this application are all or partially generated.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any proper combination thereof. For example, the computer-readable storage medium is a random access memory (RAM), a read-only memory (ROM), an erasable programmable read-only memory (EPROM), or a portable read-only memory (CD-ROM).

It is clear that a person skilled in the art may make various modifications and variations to the present invention without departing from the scope of the present invention. The present invention is intended to cover these modifications and variations provided that they fall within the scope of protection defined by the following claims.

What is claimed is:

1. A method, comprising:
    obtaining, by a first device, first detection data of network performance of a connection between a steering function (SF) device and a first user plane (UP) device, wherein the first UP device is comprised in a communication system in which a control plane (CP) is separated from a UP;
    configuring, by the first device, the SF device and the first UP device based on the first detection data, to enable a first user to access a network through the SF device and the first UP device, wherein the first detection data meets a network performance requirement of the first user;
    obtaining, by the first device, second detection data and third detection data, wherein the second detection data is detection data of the network performance of the connection between the SF device and the first UP device, the third detection data is detection data of network performance of a connection between the SF device and a second UP device, and the second UP device is comprised in the communication system; and
    configuring, by the first device, the SF device and the second UP device based on the second detection data and the third detection data, to enable a second user to access the network through the SF device and the second UP device, wherein the second detection data does not meet the network performance requirement of the second user, and the third detection data meets the network performance requirement of the second user.

2. The method according to claim 1, wherein the first device is a software designed network (SDN) controller.

3. The method according to claim 2, wherein configuring, by the first device, the first UP device based on the first detection data comprises:
sending, by the first device, first information to a CP device in the communication system, wherein the first information indicates to connect a session of the first user to the network through the first UP device.

4. The method according to claim 2, wherein configuring, by the first device, the SF device based on the first detection data comprises:
sending, by the first device, configuration information to the SF device, wherein the configuration information indicates to the SF device to connect a session of the first user to the first UP device.

5. The method according to claim 1, wherein the first detection data is sent by a software designed network (SDN) controller.

6. The method according to claim 1, wherein configuring, by the first device, the SF device based on the first detection data comprises:
sending, by the first device, second information to a software designed network (SDN) controller, wherein the second information indicates to the SDN controller to send configuration information to the SF device, and the configuration information indicates to the SF device to connect a session of the first user to the first UP device.

7. The method according to claim 6, wherein the first detection data is sent by the SDN controller.

8. The method according to claim 1, wherein configuring, by the first device, the first UP device based on the first detection data comprises:
sending, by the first device, a session table of the first user to the first UP device.

9. The method according to claim 1, further comprising:
obtaining, by the first device, third information, wherein the third information indicates that the first user requests to go online.

10. The method according to claim 1, wherein the network performance requirement of the first user is determined by the first device according to a service level agreement (SLA) of the first user.

11. The method according to claim 10, wherein the network performance comprises at least one of a network delay, a network jitter, or a network packet loss rate.

12. A network system, comprising:
a software designed network (SDN) controller;
a steering function (SF) device; and
a communication system in which a control plane (CP) is separated from a user plane (UP);
wherein the SDN controller is configured to:
obtain first detection data of network performance of a connection between the SF device and a first UP device in the communication system;
send configuration information to the SF device, wherein the configuration information indicates to the SF device to connect a session of a first user to the first UP device, and wherein the first detection data meets a network performance requirement of the first user;
send first information to a CP device in the communication system, wherein the first information indicates to connect the session of the first user to a network through the first UP device;
obtain second detection data and third detection data, wherein the second detection data is detection data of the network performance of the connection between the SF device and the first UP device, and the third detection data is detection data of network performance of a connection between the SF device and a second UP device in the communication system; and
configure the SF device and the second UP device based on the second detection data and the third detection data, to enable a second user to access the network through the SF device and the second UP device, wherein the second detection data does not meet the network performance requirement of the second user, and the third detection data meets the network performance requirement of the second user; and
wherein the CP device is configured to:
receive the first information sent by the SDN controller; and
send a session table of the first user to the first UP device.

13. The network system according to claim 12, wherein the network performance requirement of the first user is determined by the SDN controller according to a service level agreement (SLA) of the first user.

14. The network system according to claim 12, wherein the network performance comprises at least one of a network delay, a network jitter, or a network packet loss rate.

15. The network system according to claim 12, wherein the CP device is further configured to:
send an authentication request for the first user to an authentication server.

16. The network system according to claim 12, wherein the CP device is further configured to:
receive a go-online packet for the first user.

17. A network system, comprising:
a software designed network (SDN) controller;
a steering function (SF) device; and
a communication system in which a control plane (CP) is separated from a user plane (UP);
wherein a CP device in the communication system is configured to:
obtain first detection data of network performance of a connection between the SF device and a first UP device in the communication system;
send second information to the SDN controller, wherein the second information indicates to the SDN controller to send configuration information to the SF device, and the configuration information indicates to the SF device to connect a session of a first user to the first UP device, wherein the first detection data meets a network performance requirement of the first user;
send a session table of the first user to the first UP device;
obtain second detection data and third detection data, wherein the second detection data is detection data of the network performance of the connection between the SF device and the first UP device, the third detection data is detection data of a network performance of a connection between the SF device and a second UP device in the communication system; and
configure the SF device and the second UP device based on the second detection data and the third detection data, to enable a second user to access a network through the SF device and the second UP device, wherein the second detection data does not meet the network performance requirement of the second user, and the third detection data meets the network performance requirement of the second user; and wherein the SDN controller is configured to:
receive the second information; and
send configuration information to the SF device.

18. The network system according to claim 17, wherein the network performance requirement of the first user is determined by the CP device according to a service level agreement (SLA) of the first user.

19. The network system according to claim 17, wherein the CP device is further configured to:
send an authentication request for the first user to an authentication server.

* * * * *